No. 632,430. Patented Sept. 5, 1899.
C. W. SIEVER.
PANTS GUARD FOR BICYCLES.
(Application filed Dec. 28, 1898.)
(No Model.)
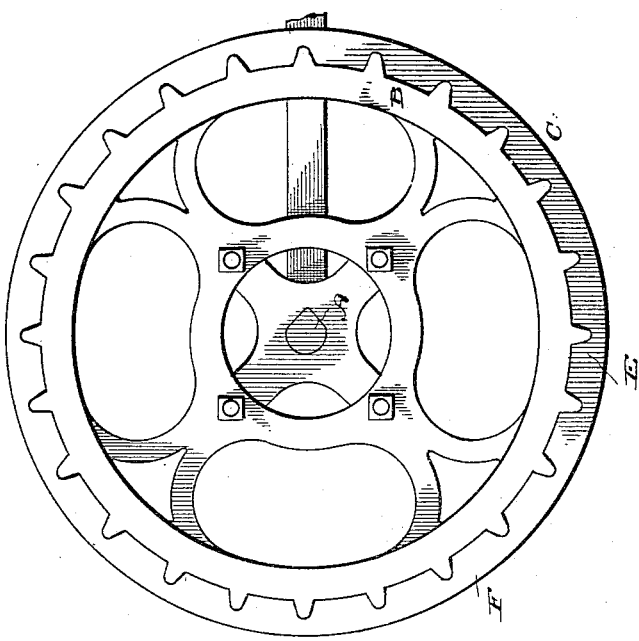
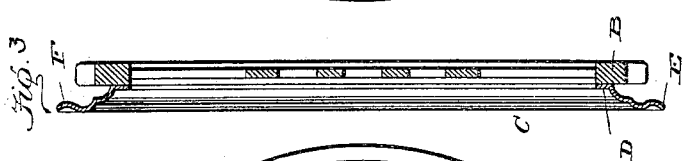
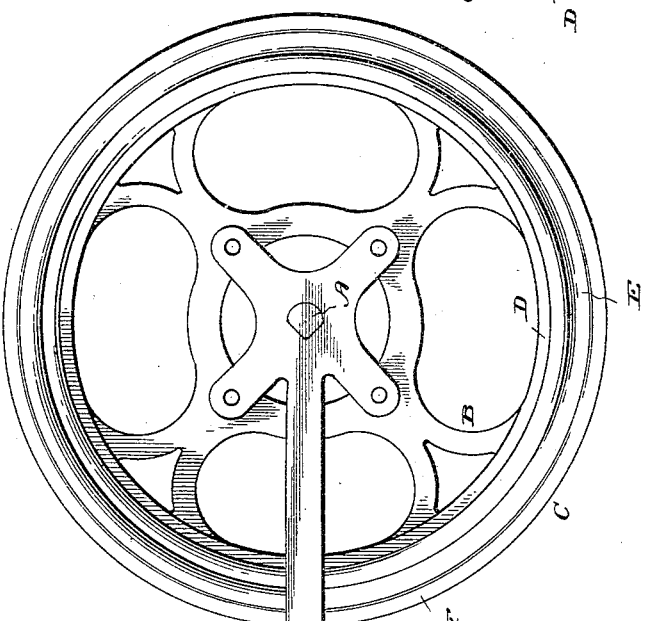
Witnesses:
Inventor:
Charles W. Siever

UNITED STATES PATENT OFFICE.

CHARLES W. SIEVER, OF KEYSER, WEST VIRGINIA.

PANTS-GUARD FOR BICYCLES.

SPECIFICATION forming part of Letters Patent No. 632,430, dated September 5, 1899.

Application filed December 28, 1898. Serial No. 700,491. (No model.)

*To all whom it may concern:*

Be it known that I, CHARLES W. SIEVER, a citizen of the United States, residing at Keyser, in the county of Mineral and State of West Virginia, have invented certain new and useful Improvements in Pants-Guards for Bicycles, of which the following is a specification.

My invention relates to improvements in pants-guards for bicycles, and the main object of my invention is the provision of a guard to be attached to the sprocket-wheel and to the axle upon the opposite side of the sprocket-wheel which will positively guard against the soiling or in any way tearing or injuring a rider's pants.

Another object of my invention is the provision of a pants-guard for bicycles which is the embodiment of simplicity, durability, and inexpensiveness, thus producing a thoroughly efficient and practical device.

To attain the desired objects, the invention consists of a pants-guard for bicycles embodying novel features of construction and combination of parts, substantially as disclosed herein.

Figure 1 represents a side elevation of a sprocket-wheel upon which my pants-guard is employed. Fig. 2 is a side elevation of the inside of a sprocket-wheel with my guard attached. Fig. 3 is a central sectional view of a sprocket-wheel provided with my guard.

In the drawings, A designates the crank-axle, carrying on each end the crank and near one end thereof a sprocket-wheel B. Secured in any way—such as bolted, soldered, or brazed—upon the outside near the periphery of the sprocket-wheel is my improved pants-guard. This guard consists of a band or ring C, which is provided with the securing base or rim D and is stamped to form the outwardly curved or projecting guard or rim E, which may be terminated in the reinforced periphery or outer edge F, said guarding-rim being so offset from the sprocket and adapted to project beyond and above the teeth of the wheel and the chain that it is impossible for the pants of the rider to in any way make contact with the chain or teeth so as to soil the same or tear them by catching them between the chain and sprocket-teeth.

From this description it is clearly shown that I provide a pants-guard for a bicycle that may be attached to any sprocket-wheel in any well-known manner, which keeps the pants from in any way coming in contact with the chain and sprocket-wheel, and which is an attractive and ornamental addition to a bicycle.

Thus it will be seen that I provide a pants-guard for bicycles which is simple, durable, and cheap and which is very useful and practical.

I claim—

In combination with a sprocket-wheel of a bicycle, of a pants-guard carried thereby, consisting of an offset ring or band whose outer periphery is beyond and offset from the base of the sprocket-wheel's teeth and the sprocket-chain.

In testimony whereof I affix my signature in presence of two witnesses.

CHARLES W. SIEVER.

Witnesses:
CHAS. N. FINNELL,
F. M. PARRISH.